(12) United States Patent
Sakraschinsky et al.

(10) Patent No.: US 10,188,969 B2
(45) Date of Patent: Jan. 29, 2019

(54) FILTER DEVICE

(71) Applicant: HYDAC FILTERTECHNIK GMBH, Sulzbach/Saar (DE)

(72) Inventors: Michael Sakraschinsky, St. Ingbert (DE); Volkmar Klein, Zweibruecken (DE)

(73) Assignee: HYDAC FILTERTECHNIK GMBH, Sulzbach/Saar (DE)

( * ) Notice: Subject to any disclaimer, the term of this patent is extended or adjusted under 35 U.S.C. 154(b) by 0 days.

(21) Appl. No.: 15/557,860

(22) PCT Filed: Jan. 12, 2016

(86) PCT No.: PCT/EP2016/000042
§ 371 (c)(1),
(2) Date: Sep. 13, 2017

(87) PCT Pub. No.: WO2016/146226
PCT Pub. Date: Sep. 22, 2016

(65) Prior Publication Data
US 2018/0050286 A1    Feb. 22, 2018

(30) Foreign Application Priority Data

Mar. 19, 2015 (DE) .......... 10 2015 003 604
Mar. 19, 2015 (DE) .......... 10 2015 003 606

(51) Int. Cl.
*B01D 29/23* (2006.01)
*B01D 35/147* (2006.01)
(Continued)

(52) U.S. Cl.
CPC .......... *B01D 29/23* (2013.01); *B01D 29/606* (2013.01); *B01D 35/147* (2013.01);
(Continued)

(58) Field of Classification Search
CPC ................ B01D 35/143; B01D 35/147; B01D 2201/295; B01D 29/23; B01D 35/1435; B01D 29/606
See application file for complete search history.

(56) References Cited

U.S. PATENT DOCUMENTS 3,794,168 A * 2/1974 Perkins ................ B01D 35/147
210/90
4,654,140 A * 3/1987 Chen .................... B01D 35/143
116/268
(Continued)

FOREIGN PATENT DOCUMENTS

DE         2 335 276        2/1974
DE    10 2007 056 362       5/2009
(Continued)

*Primary Examiner* — Terry K Cecil
(74) *Attorney, Agent, or Firm* — Wenderoth, Lind & Ponack, L.L.P.

(57) ABSTRACT

A filter device has a filter housing (1) with a filter head (3), a filter pot (7) and a removable housing cover part (51) and has a filter element (13) separating a non-filtrate side (15) from a filtrate side (17) in the housing. A bypass valve device has a valve closure element (65) preloaded by a closing spring (69) into a closed position in which it bears against a valve seat part (74). If the filter element (13) is blocked, the closure element opens up a fluid path from the non-filtrate side (15) to the filtrate side (17), by passing the filter element (13). The valve closure element (65) and the closing spring (69) are on the cover part (51). The valve seat part (74) is on an element cap (43) of the filter element (13). The element cap has a receiving part (45) forming an enclosure for that end of the filter material (27) of the filter element (13) facing toward the cover part (51).

20 Claims, 2 Drawing Sheets

(51) Int. Cl.
    *B01D 35/143*    (2006.01)
    *B01D 35/153*    (2006.01)
    *B01D 37/04*     (2006.01)
    *B01D 29/60*     (2006.01)

(52) U.S. Cl.
    CPC ....... *B01D 35/1435* (2013.01); *B01D 35/153* (2013.01); *B01D 37/046* (2013.01); *B01D 2201/295* (2013.01)

(56) References Cited

U.S. PATENT DOCUMENTS

| | | | |
|---|---|---|---|
| 7,384,547 B2 * | 6/2008 | Evanovich | B01D 29/21 |
| | | | 210/131 |
| 8,986,539 B2 * | 3/2015 | Herman | B01D 29/232 |
| | | | 210/137 |
| 9,403,107 B2 * | 8/2016 | Ardes | B01D 29/21 |
| 2010/0257824 A1 | 10/2010 | Wilkendorf et al. | |
| 2013/0270162 A1 | 10/2013 | Ardes | |

FOREIGN PATENT DOCUMENTS

| | | | | |
|---|---|---|---|---|
| DE | 10 2010 063 822 | | 6/2012 | |
| DE | 102013210065 A1 * | | 12/2014 | ........... B01D 35/147 |
| EP | 2 249 941 | | 11/2010 | |

* cited by examiner

FILTER DEVICE

FIELD OF THE INVENTION

The invention relates to a filter device having a filter housing with a filter head, a filter bowl and a removable housing cover part. A filter element accommodated in the filter housing separates a non-filtrate side from a filtrate side. A bypass valve device has a valve closure element preloaded by a closing spring into a closed position in which it bears against a valve seat part. In the case of a blocked filter element, the closure element passes into a position in which it opens up a fluid path from the non-filtrate side to the filtrate side, bypassing the filter element.

BACKGROUND OF THE INVENTION

Filter devices of this kind are state of the art and can be easily commercially obtained in a variety of designs. To cite just one example from the large number of known devices of this kind, reference is made to document EP 2 249 941B1, for example. When filter devices of this kind are used in technical equipment, such as hydraulic systems, the operational reliability of the associated equipment is largely dependent on the functional capability of the filter device. To prevent significant operational disruption from occurring in the case of a blockage of the filter element, during which the filter material thereof is overloaded with dirt particles cleaned from the fluid, the bypass valve device forms a kind of safety device. The safety device provides, as an emergency measure, a fluid path that bypasses the blocked filter material. Given the large quantities in which such filter devices are used, the production costs for such filter devices constitute a significant economic factor.

SUMMARY OF THE INVENTION

In view of these issues, a problem addressed by the invention is to provide a filter device of the type specified above, which is distinguished by a simple design that can be particularly cost-effectively produced.

According to the invention, this problem is solved by a filter device having, as a significant distinguishing feature of the invention, a valve closure element and a closing spring arranged on the cover part and the valve seat part located on an element cap of the filter element. The element cap has a receiving part forming an enclosure for the end of the filter element facing the cover part. The formation of the valve seat part on an element cap of the filter element allows the bypass valve device to be realized in a simple manner and with little material expenditure. Because the formation of the bypass valve device accounts for a not insignificant proportion of the production costs of such filter devices, the overall filter device can be correspondingly cost-effectively produced.

In particularly advantageous exemplary embodiments, the valve closure element is formed by a hollow cylinder. The cavity of the hollow cylinder is closed at one end by a base. One end of a compression spring located in the cavity is supported by the base. The other end of the spring is supported on the cover part.

The arrangement can particularly advantageously be such that, in order to form a kind of valve housing for the bypass valve device, a circular cylindrical guide wall is provided on the cover part projecting in the direction of the filter element. Along that guide wall, the hollow cylinder is guided with its external wall.

The arrangement can also advantageously be such that the hollow cylinder has a circumferential contact bevel on the outside on the end closed by the base. The circumferential contact bevel forms a valve cone that, during normal filtering operation, is held under the influence of the compression spring in tight contact with the valve seat part on the element cap.

In particularly advantageous exemplary embodiments, the element cap of the filter element has, on the enclosure for the facing end of the filter material, a receiving part in the form of a planar circular ring. The internal circumference of the circular ring, a guide part is connected that extends axially into the inner side of the filter element forming the non-filtrate side, on which guide part the valve seat part is formed.

The guide part can advantageously have the form of a hollow cone, which extends with its tapered end having an opening into the inner side of the filter element and which forms at the edge of its opening the sealing edge of the valve cone. When the bypass valve opens, the fluid path then extends through the hollow cone to the top side of the receiving part and beyond the receiving part to the outer side of the filter material forming the filtrate side.

For the purpose of structural reinforcement, the hollow cone can have a ring of projecting guide brackets at the internal circumference.

In particularly advantageous exemplary embodiments, an additional ring of uniformly distributed brackets surrounds the external circumference of the annular receiving part of the element cap. The brackets, as a continuation of the brackets located in the hollow cone, are formed plate-like and extend with their planes in the radial direction and form the supports for an annular receiving crown, which is located at an axial distance from the receiving part and at a radial distance from the outer side of the remainder of the filter element.

The formed receiving crown can be surrounded at its external circumference by a molded seal, which has a U-shaped profile cross-section. One profile limb of the molded seal forms the seal relative to the cover part and the profile crosspiece. The other profile limb of the molded seal forms the seal between the receiving crown and the filter head. In a particularly advantageous manner, an overall seal between the non-filtrate side and the filtrate side is then formed by a single sealing arrangement in conjunction with the bypass valve, which normally closes the opening of the element cap leading into the inner side of the filter element.

The receiving part, the brackets, the receiving crown and the guide part can, advantageously integrally connected to one another, form the element cap.

As an additional safety device, in addition to the bypass valve device, a differential pressure measurement device can be provided. The differential pressure measurement device is preferably supplemented with an optical evaluation unit and signals the operational state of the filter material on the basis of the pressure gradient formed at the filter material.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
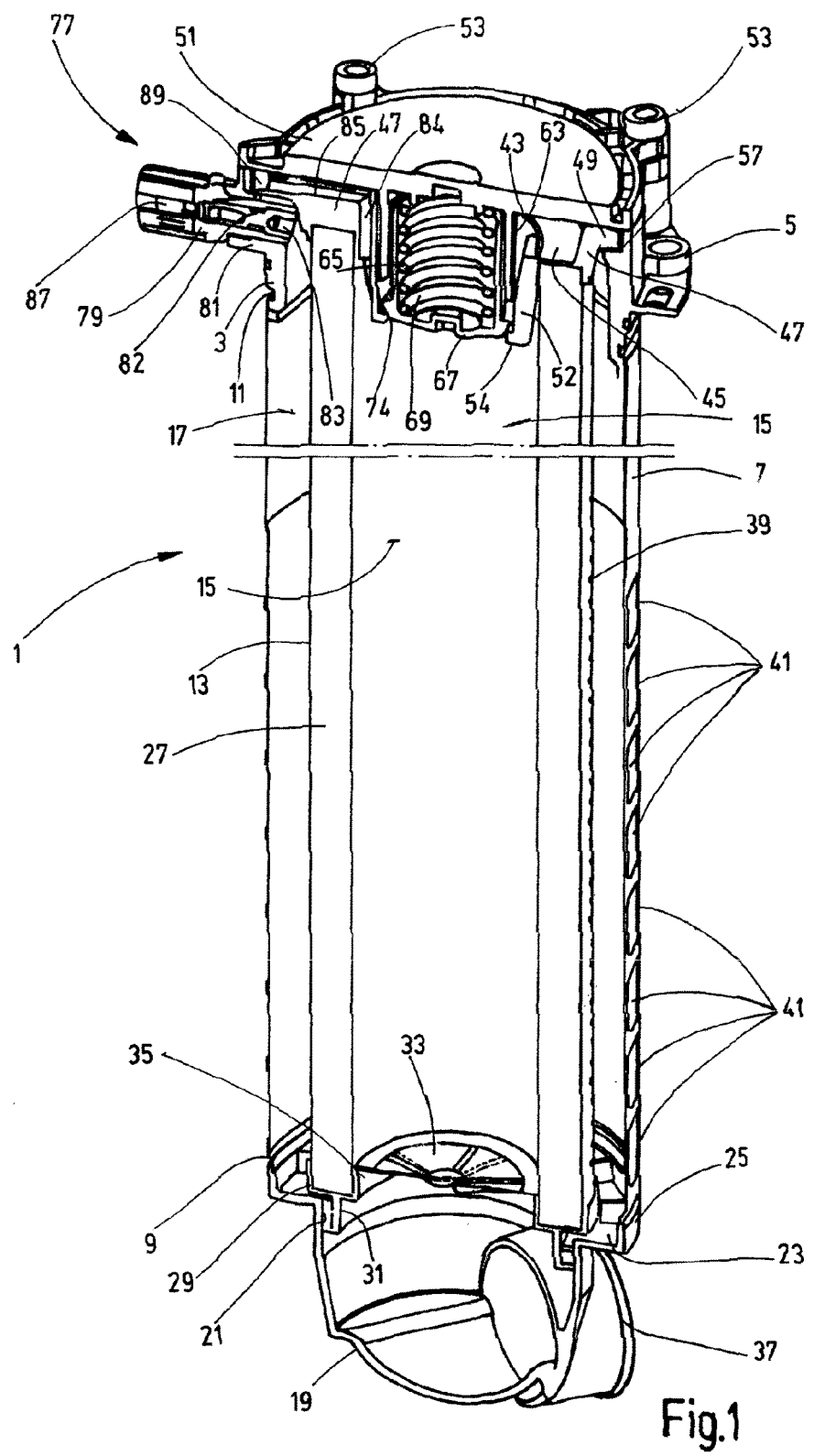
FIG. 1 is a schematically simplified, perspective view in section and truncated in the longitudinal direction, of a filter device according to an exemplary embodiment of the invention.
Figure 2:
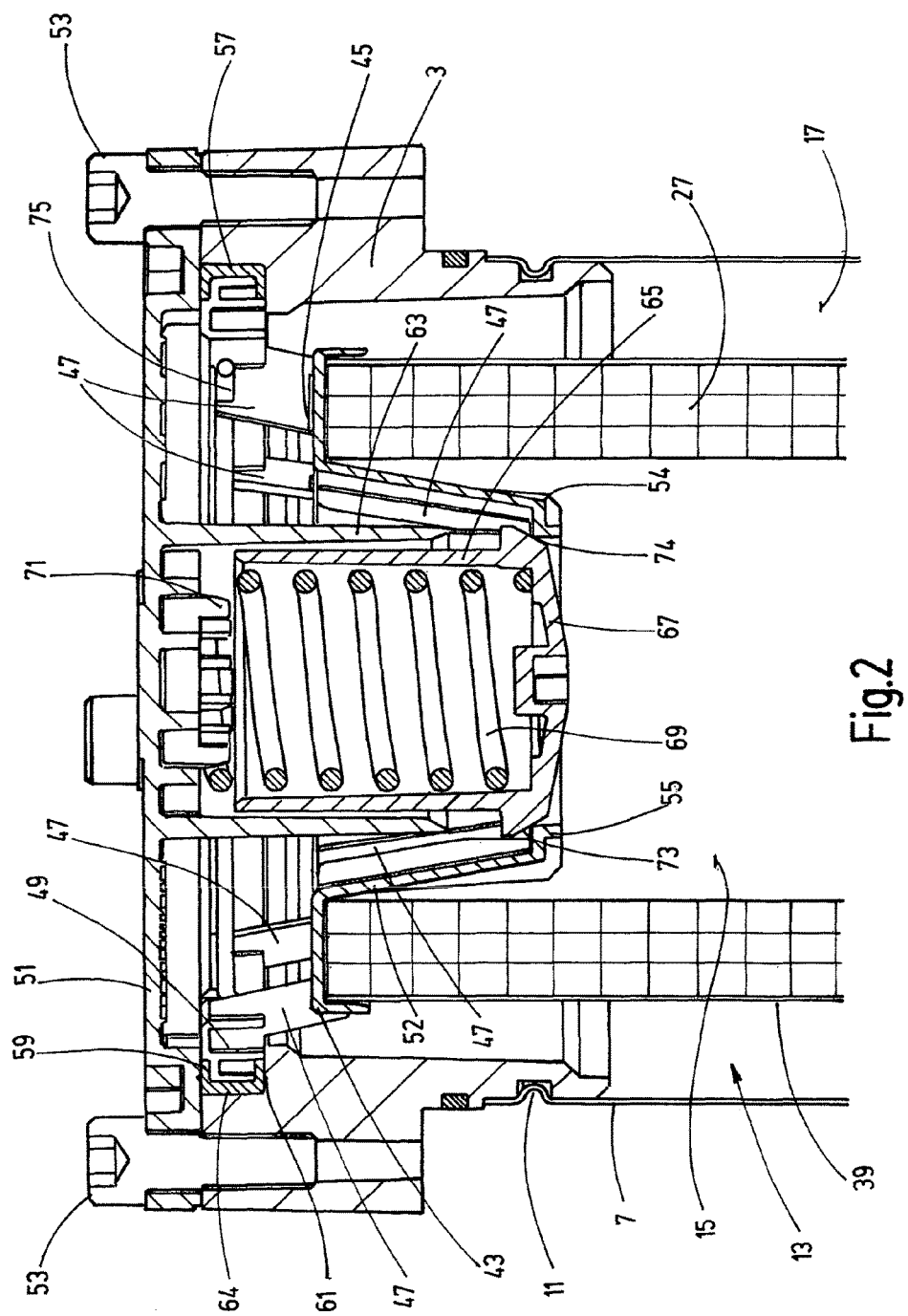
FIG. 2 is an enlarged, partial side view in section of the filter device and rotated by 90° relative to FIG. 1, the end region of the exemplary embodiment having the filter head.

With reference to the attached drawings, the invention is explained using the example of an in-tank filter device, in which the filter housing 1 has a filter head 3, on which flange parts 5 are located at the outside. The filter housing 1 can be mounted by these flange parts on the edge of a top wall opening of a storage container or tank (not depicted) in such a way that a filter bowl 7, which is connected to the bottom end of the filter head 3, extends in the vertical direction into the inside of the tank. The length of the filter bowl 7 depicted truncated in FIGS. 1 and 2 is such that the bottom end 9 of the filter bowl 7 is located below the lowest level of fluid, e.g. hydraulic oil, to be expected during operation. In the design as an in-tank filter device, in the depicted example the filter bowl 7 is in the form of a relatively thin-walled circular cylinder and is fixed on the filter head 3 by a flanging 11. The invention can be advantageously used not only in in-tank filter devices, but also in filter devices of other types.

For the filtering operation, a filter element 13 can be accommodated in an exchangeable manner in the housing 1 and can be flowed through from its inner side 15 that forms the non-filtrate side to its outer side 17 that forms the filtrate side. An inflow housing 19 is located at the bottom end 9 of the filter bowl 7. At the top opening 21 of the inflow housing 19 leading to the inner side 15 of the filter element 13, a radially outwardly projecting base 23 is formed. The peripheral edge 25 of base 23 engages in the bottom end 9 of the filter bowl 7 and is crimped. The filter element 13 has an end cap 29 at the bottom end of its hollow cylindrical filter material 27. This end cap engages with an end ring body 31 in the opening 21 of the inflow housing 19. A flap valve 33 is arranged at the central passage 35 of the end cap 29 and opens for the flow of the fluid. The fluid flows from the inlet connection 37 of the inflow housing 19 to the inner side 15 of the filter element 13.

The filtering process occurs from the inside outwards through the filter material 27. The filter material 27 is supported against the flow forces by an external sheath 39 having perforations, for example, in the form of punched holes, and forming a kind of external support tube. Instead of a sheath with punched holes, a grid structure or the like could also be provided. For the purpose of the outlet of the filtrate from the outer side 17 to the tank interior, window openings 41 are formed in the filter bowl 7. In accordance with the prior art which is standard in in-tank filters, the window openings 41 are not arranged over the entire length of the filter bowl 7. Instead they are only in selected surface areas. For example, the window openings 41 can, in accordance with the teaching provided in this respect by document EP 2 249 941 B1 and with adaption to the operational fluid level of the tank, be arranged in such a way that any gas bubbles located in the cleaned fluid can be separated and/or can be collected for a discharge.

As can be seen most clearly from FIG. 2, the filter element 13 has it's a top side facing a housing cover part 51. Housing cover part 51 can be mounted in a removable manner on the filter head 3 by screws 53. A specially formed element cap 43 is injection molded from a plastic material. However, the element cap 43 can also be formed from sheet metal or as an aluminum die cast part. As the central component, the element cap 43 has a receiving part 45 in the form of a planar circular or annular ring that, as is standard in filter element end caps, forms an enclosure for the facing end of the filter material 27. A ring of uniformly distributed, plate-shaped brackets 47 surrounds the external circumference of the receiving part 45. The planes of those brackets 47 extend in the radial direction. The brackets 47 forming the supports for an annular receiving crown 49, which is located at an axial distance from the receiving part 45 and at a radial distance from the outer side of the remainder of the filter element 13. A guide part 52 is connected to the bottom side of the receiving part 45 at the internal circumference thereof. The guide part 52 has the form of a hollow cone, which extends axially with its tapered end 54 extending into the inner side 15 of the filter element 13 and which ends at the bottom edge in a rib 55 projecting radially inwards. The brackets 47 continue below the receiving part 45 along the inner side of the guide part 52 as an additional ring of the brackets 47, which project radially inwards and extend from the bottom side of the receiving part 45 as far as the rib 55 at the bottom end 54 of the guide part 52.

As is shown most clearly in FIG. 2, the circumferential edge of the receiving crown 49 is enclosed by a molded seal 57. Seal 57 has a U-shaped cross section and has its top profile limb 59 forming the seal with the cover part 51. The bottom profile limb 61 and the profile crosspiece 64 extending between the limbs 59 and 61 form the seal relative to the filter bowl 7. The molded seal 57 then forms the seal of the overall fluid system situated above the tank wall relative to the environment.

A guide wall 63 is located on the bottom side of the cover part 51. The guide wall 63 is in the form of a circular cylinder and projects coaxially into the inside of the hollow cone formed by the guide part 52 of the element cap 43. The guide wall 63 forms a kind of valve housing, in which the valve closure element of the bypass valve device is guided in a displaceable manner. This valve closure element is formed by a hollow cylinder 65, the cavity of which is closed at one end by a base 67. A compression spring 69 is arranged in the cavity with one spring end supported on base 67 and with the other spring end being centered on a pin 71. Pin 71 projects axially from the cover part 51. The hollow cylinder 65 forming the valve closure element, which is preloaded by the compression spring 69 into the closed position depicted in FIG. 2, forms at the end closed by the base 67 at the outside a circumferential contact bevel, which forms a valve cone 73. During normal filtering operation, valve cone 63 is in sealing contact with the valve seat part under the influence of the compression spring 69. The valve seat part is formed by a sealing edge 74 at the inner edge of the rib 55 of the guide part 52. In the case of blockage of the filter material 27 of the filter element 13 and a corresponding pressure increase in the inner side 15 that forms the non-filtrate side the valve cone 73 lifts, a bypass fluid path is then formed inside the guide part 52 along the brackets 47 to the top side of the receiving part 45 and then beyond the receiving part 45 to the outer side of the filtrate side, which is located on the outer side 17 of the filter material 27.

The element cap 43 is formed in an integral manner together with the receiving part 45, the brackets 47, the receiving crown 49 and the guide part 52, and is completed with a holding bracket 75. Holding bracket 75 is fixed in a foldable manner at the ring of brackets 47 and facilitates the manipulation of the filter element 13 during installation and disassembly. In addition, a differential pressure measurement device 77 (FIG. 1) is provided that provides an indication of the operational state of the filter element 13 on the basis of the pressure gradient formed at the filter material 27 during filtering operation. The measurement device 77 has a measurement housing 79 screwed in a connection region 81 into the wall of the filter head 3. A spring-loaded measurement piston 82 is located in the measurement housing 79. One end face of piston 82 is pressurized by the instantaneous pressure of the non-filtrate side. The other end face of piston 82 is pressurized by the instantaneous pressure of the filtrate side. For the supply of the instantaneous pressure of the filtrate side, the measurement housing 79 has a passage 83 on the end abutting the outer side (filtrate side). The pressure of the non-filtrate side passes from the inner side 15 via a channel run to the measurement housing 79. The channel run has a vertical channel section 84 at the element cap 43. The vertical channel section 84 extends along a bracket 47 and has a horizontal channel section 85, leading to a space 89 formed between the cover part 51 and the filter head 3. From space 89, the channel run passes via a wall opening into the measurement housing 79. In order to obtain an indication of the piston position of the measurement piston 82 corresponding to the differential pressure, an evaluation unit 87 is connected to the outer end 15 of the measurement housing 79, which evaluation unit provides an optical signaling for example.

The receiving crown 49 is designed, up to the rib 55 that forms a sealing edge, as one part, which is preferably a component of the filter element as a whole. Because this part 49 is designed up to the sealing edge 55 as a cohesive component, despite the manufacturing tolerances that may apply to the filter element itself or to other components, the same opening pressure is always generated at the bypass valve. The same opening pressure represents a significant advantage compared with other solutions. Otherwise, the receiving housing for the bypass valve can also be designed in multiple parts up to that region.

While one embodiment has chosen to illustrate the invention, it will be understood by those skilled in the art that various changes and modifications can be made therein without departing from the scope of the invention as defined in the claims.

The invention claimed is:

1. A filter device, comprising:
a filter housing having a filter head, a filter bowl and a removable housing cover part;
a filter element separating a non-filtrate side from a filtrate side in said filter housing and having an element cap thereon forming an enclosure for an end of filter material of said filter element facing said cover part;
a bypass valve having a valve closure element preloaded by a closing spring into a closed position of said bypass valve in which said valve closure element bears against a valve seat part in a blocked position of said filter element, said bypass valve opening a fluid path from said non-filtrate side to said filtrate side bypassing said filter element, said valve closure element and said closing spring being on said cover part, said valve seat part being on said element cap;
an annular receiving part on said element cap, a guide part being connected to said receiving part, said guide part being a hollow cone, said hollow cone having a first ring of projecting guide brackets of an internal circumference of said receiving part; and
a second ring of uniformly distributed plate-like brackets surrounding an external circumference of said annular receiving part on said element cap, said plate-shaped brackets forming a continuation of said guide brackets of said hollow cone and extending with planes of said plate-shaped brackets in a radial direction and supporting an annular receiving crown located at an axial distance from said receiving part and at a radial distance from an outer side of a remainder of said filter element.

2. A filter device according to claim 1 wherein said valve closure element comprises a hollow cylinder having a cavity closed at one end by a base, said closing spring being a compression spring having a first end supported on said base and a second end supported on said cover part.

3. A filter device according to claim 2 wherein said cover part comprises a circular cylindrical guide wall projecting in a direction of said filter element, said hollow cylinder being guided with an external wall thereof along said guide wall.

4. A filter device according to claim 2 wherein said hollow cylinder has a circumferential contact bevel on an outside of an end thereof closed by said base, said circumferential contact bevel forming a valve cone held under a bias of said compression spring in tight contact with said valve seat part on said element cap.

5. A filter device according to claim 1 wherein said receiving part is on said element cap at said enclosure, said receiving part being a planar circular ring, said guide part being connected to said internal circumference of said receiving part and extending axially into an inner side of said filter element forming said non-filtrate side, said valve seat part being on said guide part.

6. A filter device according to claim 1 wherein said hollow cone extends with a tapered end thereof having an opening to an inner side of said filter element, an edge of said opening forming a sealing edge of said valve seat element.

7. A filter device according to claim 1 wherein said receiving crown is surrounded at an external circumference thereof by a molded seal, said molded seal having a U-shaped profile in cross section with a first profile limb forming a seal relative said cover part and with a crosspiece and a second profile limb forming a seal between said receiving crown and said filter head.

8. A filter device according to claim 1 wherein said receiving part, said brackets, said receiving crown and said guide part are integrally connected to one another to form said element cap.

9. A filter device according to claim 1 wherein a differential pressure measurement device is connected to said filter housing.

10. A filter device according to claim 7 wherein said differential pressure measurement device is supplemented with an optical evaluation unit.

11. A filter device, comprising:
a filter housing having a filter head, a filter bowl and a removable housing cover part;
a filter element separating a non-filtrate side from a filtrate side in said filter housing and having an element cap thereon forming an enclosure for an end of filter material of said filter element facing said cover part;
a bypass valve having a valve closure element preloaded by a closing spring into a closed position of said bypass valve in which said valve closure element bears against a valve seat part in a blocked position of said filter element, said bypass valve opening a fluid path from said non-filtrate side to said filtrate side bypassing said filter element, said valve closure element and said closing spring being on said cover part, said valve seat part being on said element cap;
an annular receiving part on said element cap at said enclosure, said receiving part being a planar circular ring, a guide part being connected to an internal circumference of said receiving part and extending axially into an inner side of said filter element forming said non-filtrate side, said valve seat part being on said guide part, said guide part being a hollow cone extending with a tapered end thereof having an opening within said inner side of said filter element, an edge of said opening forming a sealing edge of said valve seat part.

12. A filter device according to claim 11 wherein
said valve closure element comprises a hollow cylinder having a cavity closed at one end by a base, said closing spring being a compression spring having a first end supported on said base and a second end supported on said cover part.

13. A filter device according to claim 12 wherein
said cover part comprises a circular cylindrical guide wall projecting in a direction of said filter element, said hollow cylinder being guided with an external wall thereof along said guide wall.

14. A filter device according to claim 12 wherein
said hollow cylinder has a circumferential contact bevel on an outside of an end thereof closed by said base, said circumferential contact bevel forming a valve cone held under a bias of said compression spring in tight contact with said valve seat part on said element cap.

15. A filter device according to claim 11 wherein
said hollow cone has a first ring of projecting guide brackets of said internal circumference.

16. A filter device according to claim 15 wherein
a second ring of uniformly distributed plate-like brackets surrounds an external circumference of said receiving part on said element cap, said plate-shaped brackets forming a continuation of said guide brackets of said hollow cone and extending with planes of said plate-shaped brackets in a radial direction and supporting an annular receiving crown located at an axial distance from said receiving part and at a radial distance from an outer side of a remainder of said filter element.

17. A filter device according to claim 16 wherein
said receiving crown is surrounded at an external circumference thereof by a molded seal, said molded seal having a U-shaped profile in cross section with a first profile limb forming a seal relative said cover part and with a crosspiece and a second profile limb forming a seal between said receiving crown and said filter head.

18. A filter device according to claim 16 wherein
said receiving part, said brackets, said receiving crown and said guide part are integrally connected to one another to form said element cap.

19. A filter device according to claim 11 wherein
a differential pressure measurement device is connected to said filter housing.

20. A filter device according to claim 19 wherein
said differential pressure measurement device is supplemented with an optical evaluation unit.

* * * * *